United States Patent
Uehata

(10) Patent No.: US 10,710,636 B2
(45) Date of Patent: Jul. 14, 2020

(54) VEHICLE FRONT PORTION STRUCTURE

(71) Applicant: TOYOTA JIDOSHA KABUSHIKI KAISHA, Toyota-shi (JP)

(72) Inventor: Masami Uehata, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 78 days.

(21) Appl. No.: 16/008,116

(22) Filed: Jun. 14, 2018

(65) Prior Publication Data
US 2019/0031240 A1    Jan. 31, 2019

(30) Foreign Application Priority Data
Jul. 31, 2017   (JP) .................................. 2017-147767

(51) Int. Cl.
*B62D 21/11* (2006.01)
*B62D 21/02* (2006.01)
*B62D 25/08* (2006.01)
*B62D 21/15* (2006.01)

(52) U.S. Cl.
CPC .............. *B62D 21/11* (2013.01); *B62D 21/02* (2013.01); *B62D 21/152* (2013.01); *B62D 25/082* (2013.01); *B62D 25/088* (2013.01)

(58) Field of Classification Search
CPC ...... B62D 21/11; B62D 21/02; B62D 25/082; B62D 25/088; B62D 21/152
See application file for complete search history.

(56) References Cited

U.S. PATENT DOCUMENTS

| 2012/0306234 A1* | 12/2012 | Akaki ................. B62D 21/02 296/187.03 |
|---|---|---|
| 2013/0161978 A1 | 6/2013 | Herntier et al. |
| 2015/0183468 A1 | 7/2015 | Shirooka |
| 2016/0244103 A1 | 8/2016 | Amemiya |
| 2017/0174265 A1 | 6/2017 | Maruyama et al. |

FOREIGN PATENT DOCUMENTS

| JP | 2005-219607 A | 8/2005 |
| JP | 2009-220718 A | 10/2009 |
| JP | 2015-85801 | 5/2015 |
| JP | 2015-123887 | 7/2015 |

* cited by examiner

*Primary Examiner* — D Glenn Dayoan
*Assistant Examiner* — Melissa Ann Bonifaz
(74) *Attorney, Agent, or Firm* — Oblon, McClelland, Maier & Neustadt, L.L.P.

(57) ABSTRACT

Provided is a vehicle front portion structure including: front side members that are disposed at right and left side portions of a vehicle front portion and extend in the vehicle front and rear direction; suspension towers that are disposed so as to project in the vehicle upward direction from the front side members; front joining portions that are provided on the suspension towers, join the suspension towers and the front side members to each other, and at which joining between the suspension towers and the front side members are cancelled at the time of a frontal impact; and rear joining portions that are provided on the vehicle rear sides of the front joining portions in the suspension towers and join the suspension towers and the front side members to each other.

6 Claims, 7 Drawing Sheets

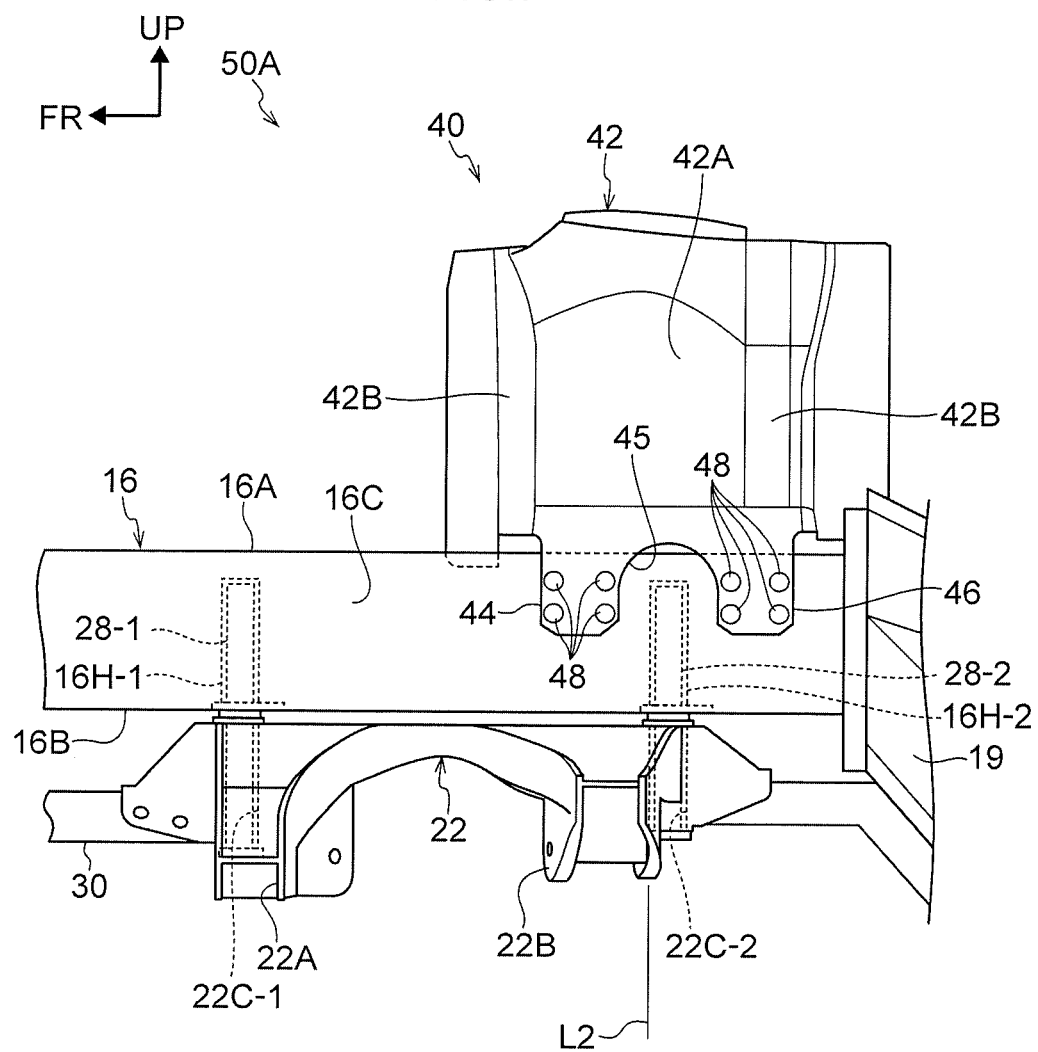

VEHICLE FRONT PORTION STRUCTURE

CROSS-REFERENCE TO RELATED APPLICATION

This application is based on and claims priority under 35 USC 119 from Japanese Patent Application No. 2017-147767 filed on Jul. 31, 2017, the disclosure of which is incorporated by reference herein.

BACKGROUND

Technical Field

The present disclosure relates to a vehicle front portion structure.

Related Art

Japanese Patent Application Laid-Open (JP-A) No. 2015-85801 discloses a vehicle body structure where a suspension tower bridges an apron upper member and a front side member. A side member configuring portion is integrally formed in the suspension tower so as to configure part of a closed cross section of the front side member, and load transmission is efficiently performed.

Ordinarily, even when the front side member becomes crushingly deformed in the vehicle front and rear direction by a frontal impact, the part where the suspension tower is attached to the front side member remains without being crushed. Consequently, in the case of a frontal impact, there arises the need to ensure an amount of deformation for the front side member on the front side of the attached part of the suspension tower in order to allow the front side member to be deformed a predetermined amount and absorb the impact energy.

For that reason, there arises the need to lengthen the part of the front side member on the front side of the attached part of the suspension tower, and design freedom is reduced.

SUMMARY

In view of the circumstances described above, the present disclosure provides a vehicle front portion structure that can ensure design freedom while keeping the total length of the front side member from increasing.

A vehicle front portion structure pertaining to a first aspect of the disclosure includes: front side members that are disposed at right and left side portions of a vehicle front portion and that extend in a vehicle front and rear direction; suspension towers that are disposed so as to project in a vehicle upward direction from the front side members; front joining portions that are provided on the suspension towers, and join the suspension towers and the front side members to each other, and at which the joining between the suspension towers and the front side members is cancelled at a time of a frontal impact; and rear joining portions that are provided at the vehicle rear sides of the front joining portions in the suspension towers and that join the suspension towers and the front side members to each other.

In the vehicle front portion structure of the first aspect of the disclosure, the suspension towers and the front side members are joined to each other by the front joining portions and the rear joining portions. The front joining portions join the suspension towers and the front side members to each other, but the joining between the suspension towers and the front side members are cancelled at the time of a frontal impact. The rear joining portions join the suspension towers and the front side members to each other on the vehicle rear sides of the front joining portions.

In the vehicle front portion structure having the above configuration, when a shock is input from the vehicle front side by a frontal impact, the front side members absorb the load while becoming deformed in the vehicle front and rear direction from their front sides. Moreover, the joining between the suspension towers and the front side members resulting from the front joining portions are cancelled by the load transmitted from the front side members, and the parts of the front side members that had been joined to the front joining portions also become deformed and absorb the load.

In this way, the parts of the front side members joined to the front joining portions can also be deformed, so an amount of deformation for the front side members at the time of a frontal impact can be ensured and the load can be absorbed. Consequently, it becomes unnecessary to forwardly lengthen the front side members in order to ensure the amount of deformation. Design freedom can be ensured while keeping the total length of the front side members from increasing.

In a vehicle front portion structure pertaining to a second aspect of the disclosure, a joining strength between the suspension towers and the front side members at the front joining portions is weaker than a joining strength between the suspension towers and the front side members at the rear joining portions.

In the vehicle front portion structure of the second aspect of the disclosure, the joining strength between the suspension towers and the front side members is weaker at the front joining portions than at the rear joining portions, so it can be made easier to cancel the joining at the front joining portions at the time of a frontal impact while ensuring the joining strength between the suspension towers and the front side members.

In a vehicle front portion structure of a third aspect of the disclosure, the front joining portions and the rear joining portions project in a vehicle downward direction from lower ends of the suspension towers, and recess portions are formed between the front joining portions and the rear joining portions.

In the vehicle front portion structure of the third aspect of the disclosure, the recess portions are formed between the front joining portions and the rear joining portions that project in the vehicle downward direction from the lower ends of the suspension towers. Consequently, when a load has been input from the vehicle front side at the time of a frontal impact, it can be made easier to crush the suspension towers in the vehicle front and rear direction.

A vehicle front portion structure pertaining to a fourth aspect of the disclosure further includes a suspension member that is attached by attachment portions to the front side members, wherein the attachment portions are disposed in positions coinciding in the vehicle front and rear direction with the rear joining portions.

In the vehicle front portion structure pertaining to the fourth aspect of the disclosure, the attachment portions, which attach the suspension member to the front side members, and the rear joining portions are disposed in positions coinciding with each other in the vehicle front and rear direction. When a shock has been input from the front at the time of a frontal impact, the attachment portions and the rear joining portions become crushing remnants, so by disposing these in positions coinciding with each other in the vehicle front and rear direction, the crushing remnant amount can be reduced.

According to the vehicle front portion structure pertaining to the disclosure, design freedom can be ensured while keeping the total length of the front side members from increasing.

BRIEF DESCRIPTION OF THE DRAWINGS

Exemplary embodiments of the present disclosure will be described in detail based on the following figures, wherein:

FIG. 7 is a side view of a vehicle front portion structure pertaining to an example modification of the second embodiment.

DETAILED DESCRIPTION

First Embodiment

Figure 1:
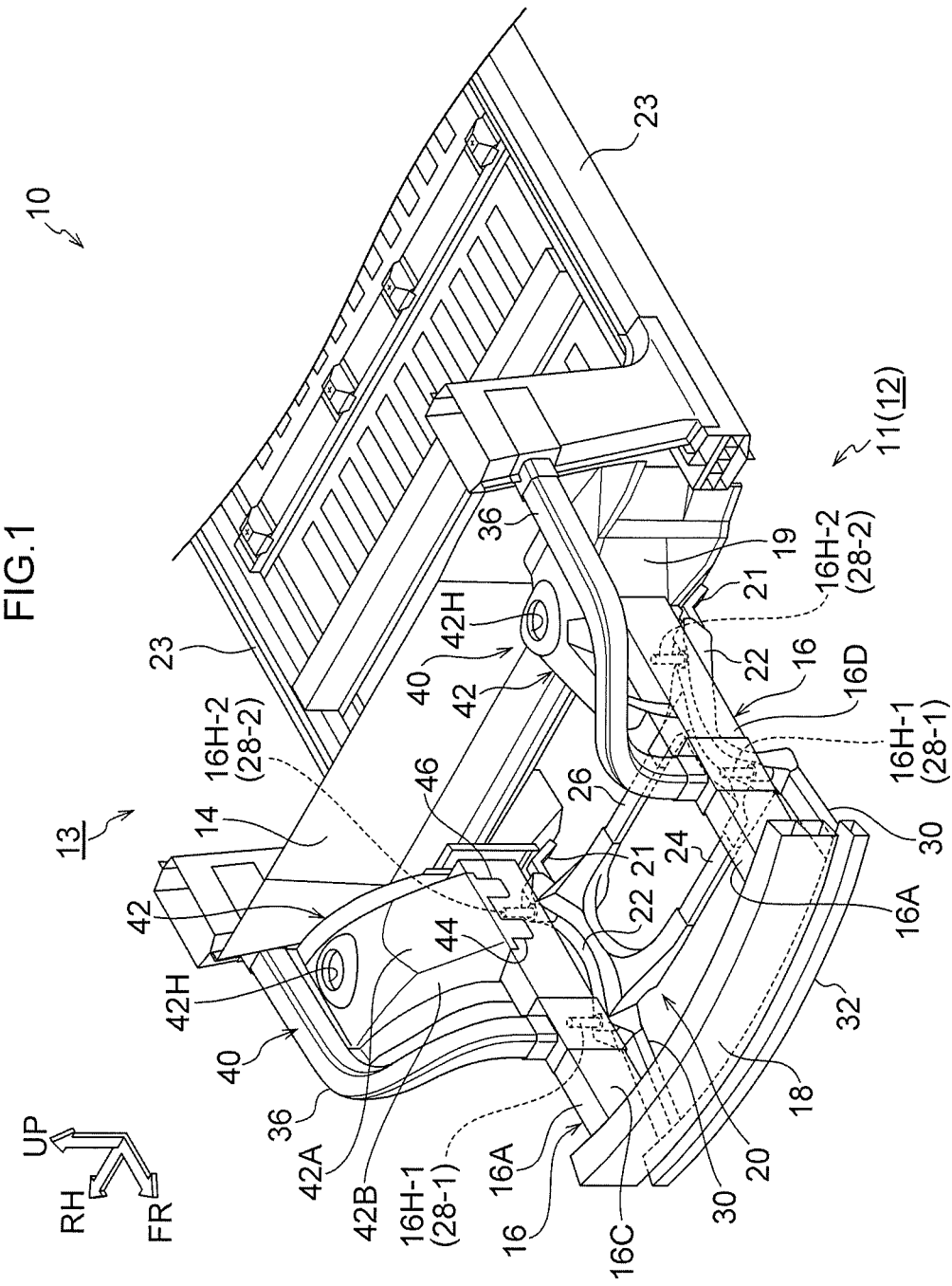
FIG. 1 is a perspective view, from above, of a vehicle front portion structure pertaining to a first embodiment.

A vehicle front portion structure 11 pertaining to a first embodiment of the disclosure will be described based on FIG. 1 to FIG. 5. It will be noted that arrow FR, arrow UP, arrow LH, and arrow RH appropriately shown in the drawings indicate, respectively, a forward direction (traveling direction), an upward direction, a leftward direction, and a rightward direction of the vehicle. When description is given below simply using the directions of front/rear, right/left, and upper/lower, unless otherwise indicated these will be intended to mean front/rear in the vehicle front and rear direction, right/left in the vehicle right and left direction (vehicle width direction), and upper/lower in the vehicle up and down direction.

Figure 2:
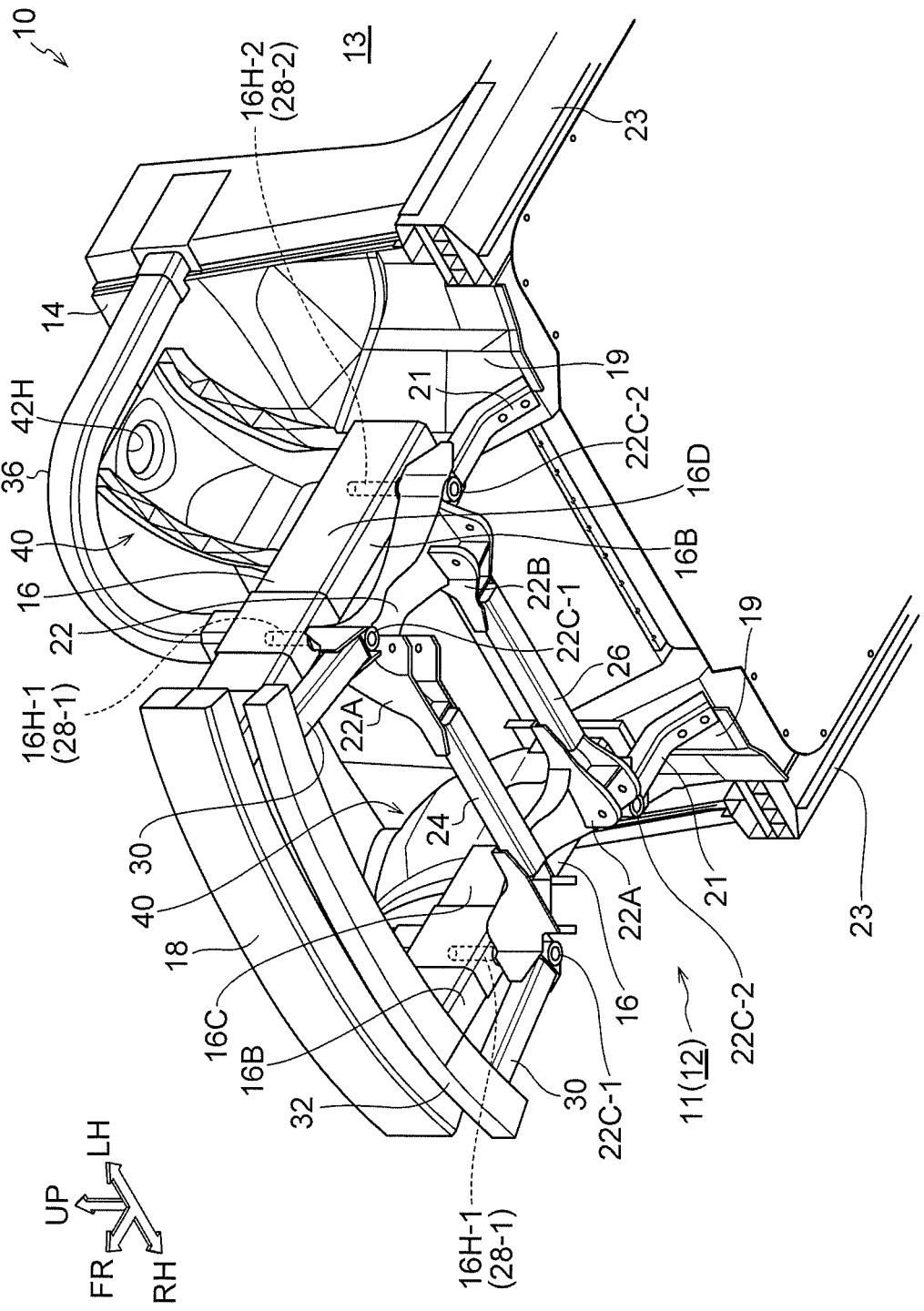
FIG. 2 is a perspective view, from below, of the vehicle front portion structure pertaining to the first embodiment.

As shown in FIG. 1 and FIG. 2, the vehicle front portion structure 11 pertaining to the present embodiment is applied to a front portion of a vehicle 10 such as an electric automobile, for example, and is equipped with a power unit compartment 12 and a cabin 13. The power unit compartment 12 and the cabin 13 are partitioned from each other by a dash panel 14, and the power unit compartment 12 is disposed on the front side of the cabin 13.

Though not shown in the drawings, various members such as electrical components, a gear box, and auxiliaries can be housed in the power unit compartment 12. Furthermore, a right and left pair of front side members 16 that extend along the vehicle front and rear direction on both side portions in the vehicle width direction are disposed in the power unit compartment 12.

Each front side member 16 is one vehicle frame member, has a closed cross section with a rectangular tube shape, and has an upper surface portion 16A, a lower surface portion 16B, an inner surface portion 16C, and an outer surface portion 16D. A front reinforcement 18 that extends along the vehicle width direction in the vehicle front end portion is joined by welding or fastening to front end portions of the front side members 16. It will be noted that separate crash boxes may also be interposed as shock absorbing members between the front end portions of the front side members 16 and the front reinforcement 18.

A right and left pair of rockers 23 that extend along the vehicle front and rear direction are provided on both vehicle width direction outer sides of the lower portion of the cabin 13. The right and left pair of rockers 23 are each one vehicle frame member forming a closed cross section. A battery pack (not shown in the drawings) is disposed between the pair of rockers 23, so that power can be supplied to power units such as a motor.

Rear end portions of the front side members 16 are joined to front end portions of front side member rear members 19. Rear end portions of the front side member rear members 19 are joined to front ends of the rockers 23.

A suspension member 20 that supports front suspensions (not shown in the drawings) is provided on the lower side of the front side members 16. The suspension member 20 has a pair of side rails 22, a front cross member 24, and a rear cross member 26. The pair of side rails 22 are disposed under the front side members 16. The pair of side rails 22 are disposed away from the front side members 16 so as to be substantially parallel to the front side members 16 as seen in a side view.

Side rail front end portions 22A that project inward in the vehicle width direction are formed on front end portions of the side rails 22, and side rail rear end portions 22B that project inward in the vehicle width direction are formed on rear end portions of the side rails 22. The side rail front end portions 22A of the pair of side rails 22 oppose each other in the vehicle width direction and are coupled to each other by the front cross member 24. The side rail rear end portions 22B of the pair of side rails 22 oppose each other in the vehicle width direction and are coupled to each other by the rear cross member 26. Coupling portions 21 are provided on the vehicle rear sides of the side rails 22, and rear ends of the coupling portions 21 are coupled to the front side member rear members 19.

Front insertion hole portions 22C-1 and rear insertion hole portions 22C-2 are formed in the front ends and the rear ends, respectively, of the side rails 22. Front bolt hole portions 16H-1 are formed in the lower surface portions 16B of the front side members 16 in positions corresponding to the front insertion hole portions 22C-1. Rear bolt hole portions 16H-2 are formed in the lower surface portions 16B of the front side members 16 in positions corresponding to the rear insertion hole portions 22C-2. Female threads are formed in the front bolt hole portions 16H-1 and the rear bolt hole portions 16H-2. The front insertion hole portions 22C-1 and the front bolt hole portions 16H-1 are continuous with each other in the up and down direction, and the rear insertion hole portions 22C-2 and the rear bolt hole portions 16H-2 are continuous with each other in the up and down direction. Front bolts 28-1 are inserted from the front insertion hole portion 22C-1 sides, and rear bolts 28-2 are inserted from the rear insertion hole portion 22C-2 sides. The front bolts 28-1 and the rear bolts 28-2 screw into the female threads of the front bolt hole portions 16H-1 and the female threads of the rear bolt hole portions 16H-2, respectively. Each of the side rails 22 is supported, at both end portions in the vehicle front and rear direction, by the front bolts 28-1 and the rear bolts 28-2 so as to be hung from the front side members 16.

The side rails 22, the side rail front end portions 22A, and the side rail rear end portions 22B are integrally configured. In the present embodiment, the side rails 22, the side rail front end portions 22A, and the side rail rear end portions 22B are manufactured by aluminum die casting using aluminum as the main material. Furthermore, the front cross member 24 and the rear cross member 26 are aluminum-extruded parts manufactured by extrusion molding aluminum. Suspension arms (not shown in the drawings) are attached via mount members (not shown in the drawings) to the lower sides of the side rail front end portions 22A and the side rail rear end portions 22B.

Lower side members 30 are coupled to the front end portions of the pair of side rails 22. The lower side members 30 extend in the vehicle forward direction from the front end portions of the side rails 22. A lower reinforcement 32 is attached to front ends of the lower side members 30. The lower reinforcement 32 extends in the vehicle width direction and couples the front ends of the pair of lower side members 30 to each other. Furthermore, the lower reinforcement 32 is disposed directly under the front reinforcement 18 so as to coincide in the vehicle up and down direction with the front reinforcement 18.

Upper members 36 are disposed on the upper sides of the front side members 16.

Front ends of the upper members 36 are joined to the upper portions of the front side members 16 in positions a little toward the front sides thereof. The upper members 36 curve outward in the vehicle width direction while extending upward at their front sides, then curve in the vehicle rearward direction at their vehicle width direction outer sides, and then extend substantially parallel to the front side members 16 at the rear sides of the curved parts.

Figure 3:
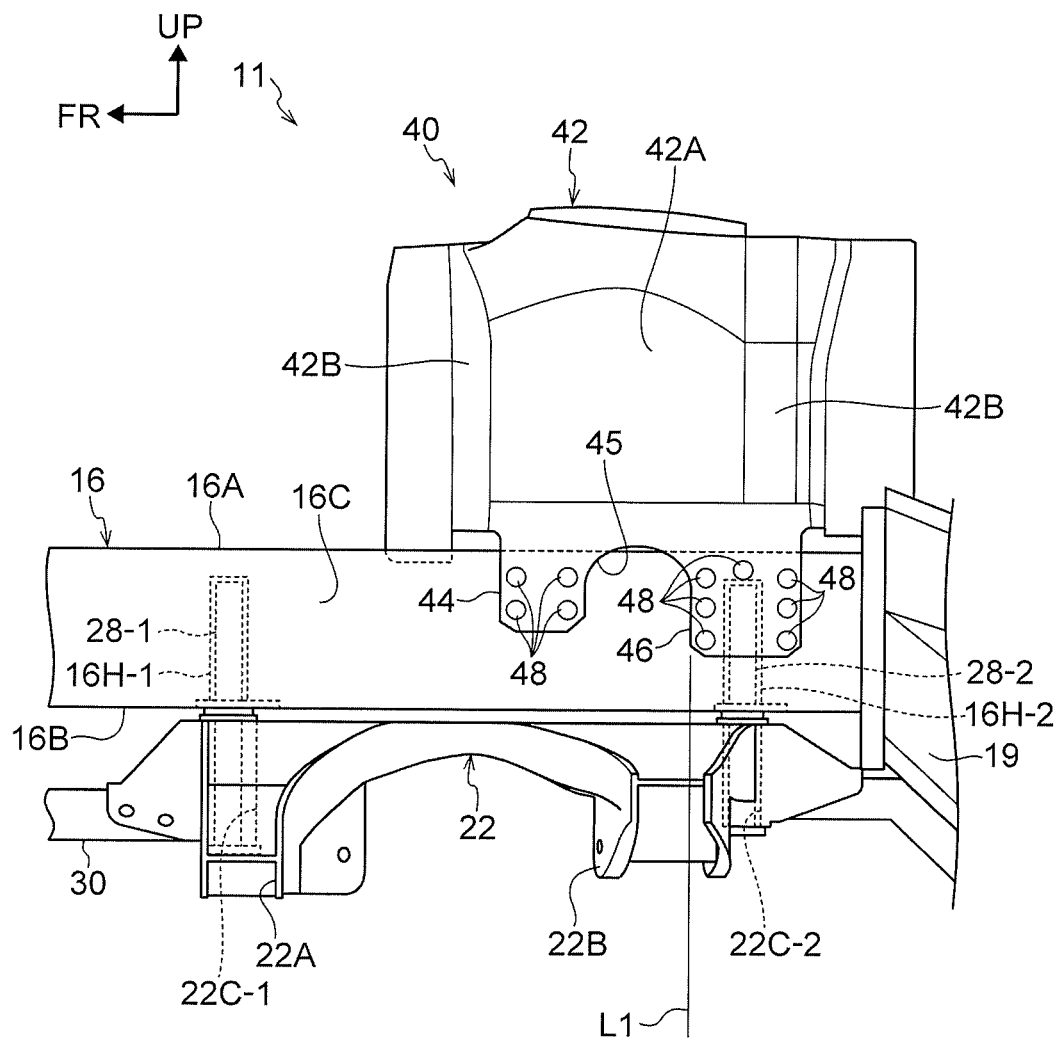
FIG. 3 is a side view of the vehicle front portion structure pertaining to the first embodiment.
Figure 4:
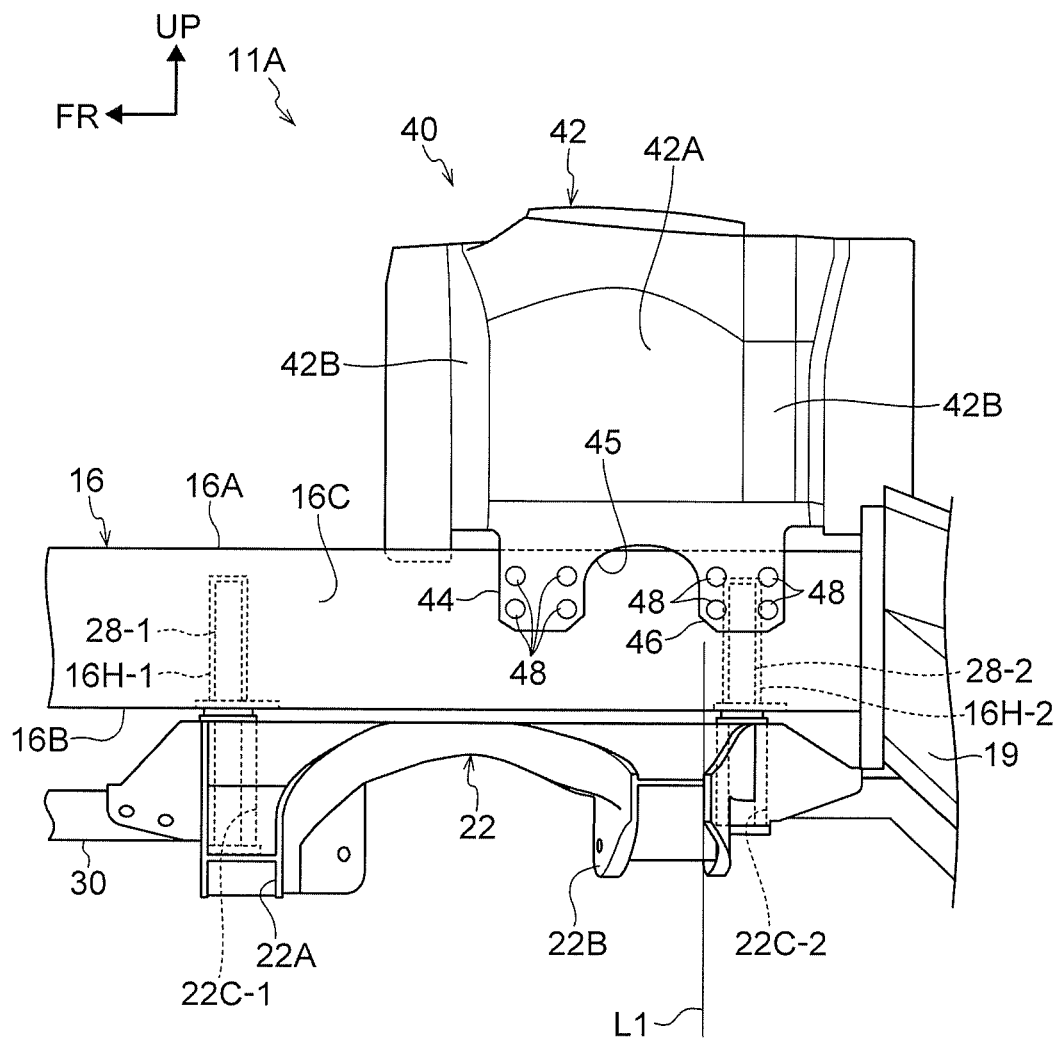
FIG. 4 is a side view of a vehicle front portion structure pertaining to an example modification of the first embodiment.
Figure 5:
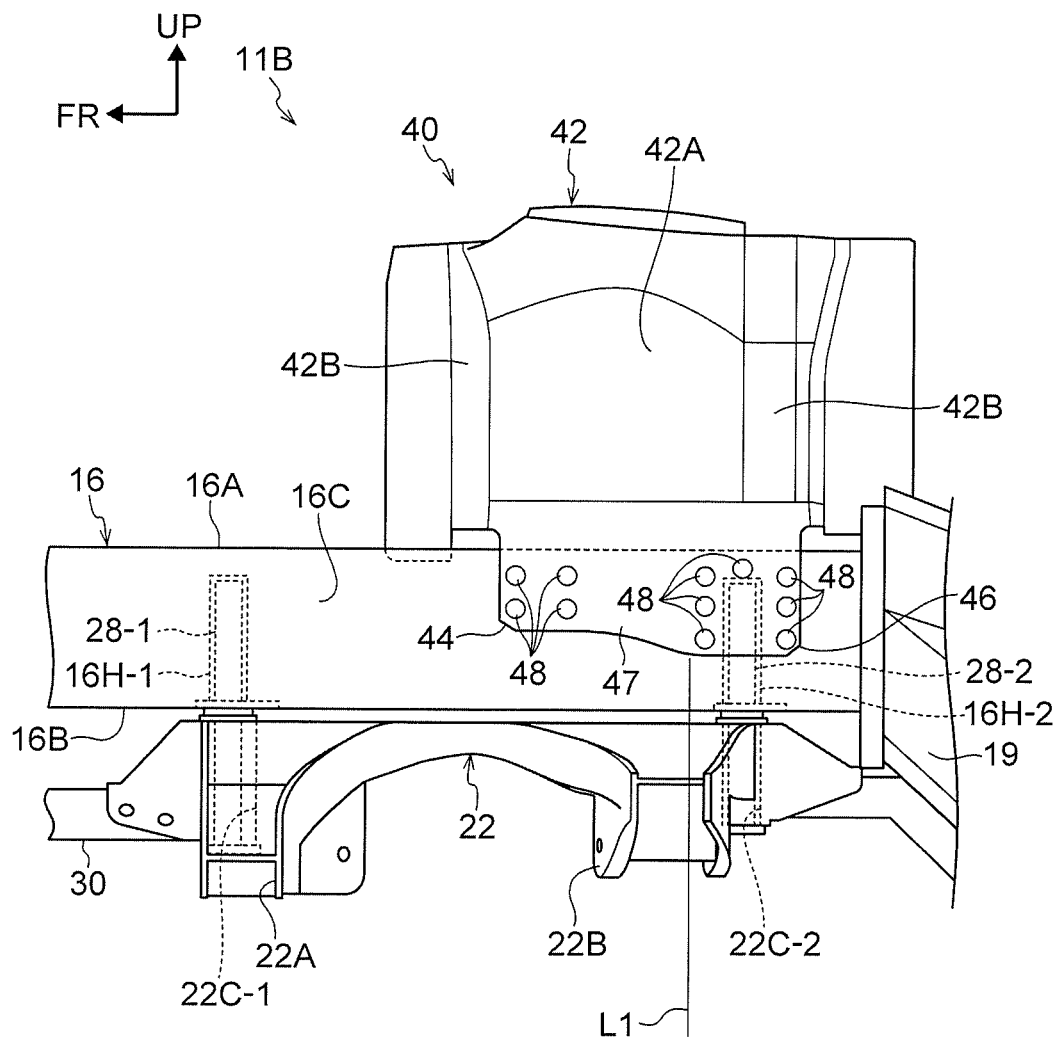
FIG. 5 is a side view of a vehicle front portion structure pertaining to another example modification of the first embodiment.

Suspension towers 40 are disposed between the front side members 16 and the upper members 36. As shown in FIG. 3, the suspension towers 40 each have a suspension tower body portion 42, a front joining portion 44, and a rear joining portion 46. The suspension tower body portion 42 has a central wall 42 and side walls 42B. The central wall 42A extends upward from the inner surface portion 16C of the front side member 16, curves outward in the vehicle width direction at its upper portion, and is coupled to the upper member 36. A through hole 42H, through which a suspension (not shown in the drawings) is passed, is formed in the upper portion of the central wall 42A. The side walls 42B are integrally disposed continuously with both vehicle front and rear direction sides of the central wall 42A, and lower end portions of the side walls 42B are disposed across the upper surface portions 16A of the front side members 16 in the vehicle width direction (see FIG. 1).

The front joining portions 44 and the rear joining portions 46 are provided on lower ends of the central walls 42A. The front joining portions 44 project downward from the front sides of the lower ends of the central walls 42A and are joined to the inner surface portions 16C by tower joining members 48. The rear joining portions 46 project more downward than the front joining portions 44 from the rear sides of the lower ends of the central walls 42A and are joined to the inner surface portions 16C by tower joining members 48. The front joining portions 44 are disposed more rearward than the front bolt hole portions 16H-1 of the front side members 16 in the vehicle front and rear direction. The rear joining portions 46 are disposed in positions coinciding with the rear bolt hole portions 16H-2 of the front side members 16. As the tower joining members 48, for example, fastening by means of bolts and nuts, fastening by means of rivets, and joining by means of welding can be employed.

The front joining portions 44 and the rear joining portions 46 are substantially rectangular in shape as seen in a side view. The vehicle front and rear direction length of the rear joining portions 46 is set longer than the vehicle front and rear direction length of the front joining portions 44, and the vehicle up and down direction length of the rear joining portions 46 is set longer than the vehicle up and direction length of the front joining portions 44.

The front joining portions 44 and the rear joining portions 46 are spaced apart from each other, and recess portions 45 are formed between the front joining portions 44 and the rear joining portions 46. Upper ends of the recess portion 45 are disposed more upward than the tower joining members 48 in the front joining portions 44 and the rear joining portions 46.

Each front joining portion 44 is joined to each inner surface portion 16C by the tower joining members 48 in a total of four places: two points top to bottom by two points front to rear. Each rear joining portion 46 is joined to each inner surface portion 16C by the tower joining members 48 in a total of seven places: six places comprising three points top to bottom by two points front to rear, plus one point disposed between the top two points. The joining strength between the front joining portions 44 and the inner surface portions 16C is set to a magnitude where, when a load equal to or greater than a predetermined load has been input at the time of a frontal impact, the joining between both (the front joining portions 44 and the inner surface portions 16C) are cancelled. The "predetermined load at the time of a frontal impact" here is based on the smallest load among loads transmitted to at least one of the front side members 16 in the 56 km/h full overlap test determined by the US NCAP, for example, in the case of a full overlap impact, and a 40% offset 64 km/h test determined by the Euro NCAP, for example, in the case of an offset impact among frontal impact tests. The joining strength between the rear joining portions 46 and the inner surface portions 16C is set to a magnitude where, when the predetermined load at the time of a frontal impact has been input, the joining between both (the rear joining portions 46 and the inner surface portions 16C) are maintained.

Next, the action and effects of the first embodiment will be described.

When the vehicle 10 sustains a frontal impact, a load is input from the front reinforcement 18 and the lower reinforcement 32. The load that has been input is transmitted to the front side members 16 and the lower side members 30, and the front side members 16 and the lower side members 30 absorb the load by becoming crushed and deformed in the vehicle front and rear direction from their front sides. Here, the joining strength between the front joining portions 44 and the inner surface portions 16C is set to a magnitude where the joining are cancelled at the time of a frontal impact. Consequently, the joining between the front joining portions 44 and the inner surface portions 16C become cancelled, and the suspension towers 40 and the front side members 16 both become crushed and deformed. The joined portions between the rear joining portions 46 and the inner surface portions 16C as well as the rear bolts 28-2 remain without being crushed in the vehicle front and rear direction. Because of this, the front ends of the joined portions between the rear joining portions 46 and the inner wall surfaces 16C (see line L1 in FIG. 3) become the rear ends of the crushing deformation, and the load can be absorbed by allowing the front sides of the lines L1 to be crushingly deformed. It will be noted that the side rails 22 can be deformed in such a way that their vehicle front and rear direction lengths become shorter as a result of the side rails 22 breaking or rotating downward using the coupling portions 21 as rotational centers.

In the vehicle front portion structure 11 of the present embodiment, the joining between the front joining portions 44 and the inner surface portions 16C become cancelled at the time of a frontal impact, so the parts where the front joining portions 44 and the inner surface portions 16C had been joined to each other, as well as the rear sides thereof, can also be crushingly deformed. Consequently, an amount of deformation for the front side members 16 can be ensured and the load can be absorbed. Because of this, there is no longer the need to forwardly lengthen the front side members 16 in order to ensure the amount of deformation, and overhang can be shortened. As a result, design freedom can be ensured and the weight of the vehicle can be reduced.

Furthermore, in the present embodiment, the recess portions 45 are formed between the front joining portions 44 and the rear joining portions 46, so when a load has been input from the front at the time of a frontal impact, it can be made easy to crush the suspension towers 40 in the vehicle front and rear direction.

Furthermore, in the present embodiment, the joining strength between the front joining portions 44 and the front side members 16 is set smaller than the joining strength between the rear joining portions 46 and the front side members 16, so it can be made easy to cancel the joining in regard to the front joining portions 44 at the time of a frontal impact while ensuring the joining strength between the suspension towers 40 and the front side members 16.

Furthermore, in the present embodiment, the rear joining portions 46 and the rear bolts 28-2 that ordinarily become crushing remnants are disposed in positions coinciding with each other in the vehicle front and rear direction. Consequently, the crushing remnant amount when a shock has been input from the front at the time of a frontal impact can be reduced.

It will be noted that although in the present embodiment the fastening force between the rear joining portions 46 and the front side members 16 is set larger than the fastening force between the front joining portions 44 and the front side members 16, it is not invariably necessary to set the relationship between the magnitudes of the fastening forces in this way. For example, as in a vehicle front portion structure 11A shown in FIG. 4, the number of places where the rear joining portions 46 are joined to the front side members 16 may also be reduced from seven to four so that the fastening force between the rear joining portions 46 and the front side members 16 is set about the same as the fastening force between the front joining portions 44 and the front side members 16.

Furthermore, in the present embodiment, the recess portions 45 are formed between the front joining portions 44 and the rear joining portions 46, but it is not invariably necessary to form the recess portions 45. For example, as in a vehicle front portion structure 11B shown in FIG. 5, the recess portions 45 may also be eliminated so that the front joining portions 44 and the rear joining portions 46 are made continuous with each other by continuing portions 47.

Second Embodiment

Next, a second embodiment of the disclosure will be described. It will be noted that, regarding configurations and action that are the same as in the first embodiment, the same reference signs as in the first embodiment will be assigned thereto and description thereof will be omitted.

Figure 6:
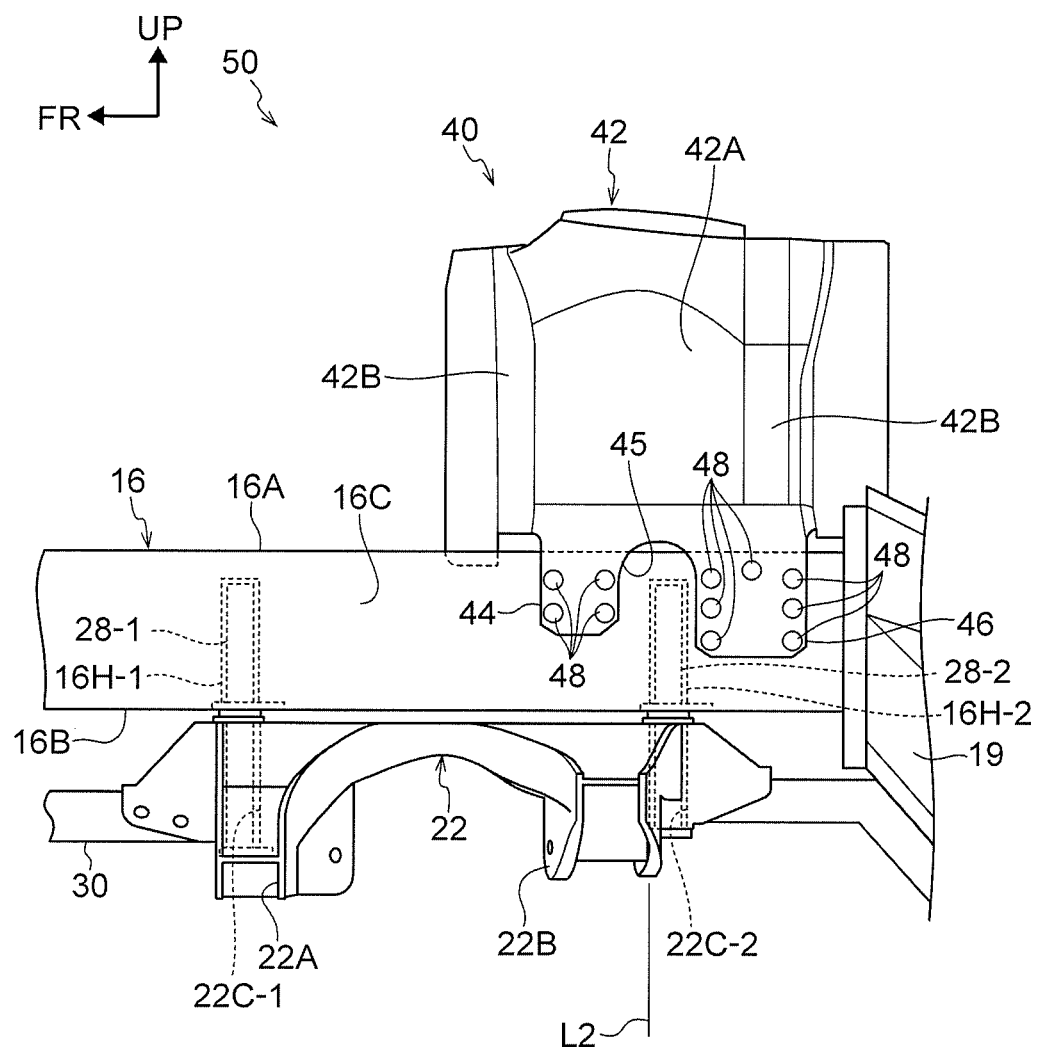
FIG. 6 is a side view of a vehicle front portion structure pertaining to a second embodiment.

FIG. 6 is a side view showing a partial configuration of a vehicle front portion structure 50 pertaining to the second embodiment. In the present embodiment, the position where the suspension member 20 is attached to the front side members 16 differs from the position in the first embodiment, but other configurations are the same as in the first embodiment.

In the present embodiment, the suspension towers 40 are disposed more forward than they are in the first embodiment relative to the front side members 16. Specifically, the rear insertion hole portions 22C-2, the rear bolt hole portions 16H-2, and the rear bolts 28-2 are disposed in positions corresponding to the recess portions 45 formed between the front joining portions 44 and the rear joining portions 46 of the front side members 16.

In the present embodiment, the front ends of the rear bolts 28-2 (see line L2 in FIG. 6) become the rear ends of crushing deformation, and the load can be absorbed by allowing the front sides of the lines L2 to become crushingly deformed.

In the vehicle front portion structure 50 of the present embodiment also, the joining between the front joining portions 44 and the inner surface portions 16C become cancelled at the time of a frontal impact, so the parts where the front joining portions 44 and the inner surface portions 16C had been joined to each other, as well as the rear sides thereof, can also be crushingly deformed. Consequently, an amount of deformation for the front side members 16 can be ensured and the load can be absorbed. Because of this, there is no longer the need to forwardly lengthen the front side members 16 in order to ensure an amount of deformation, and overhang can be shortened. As a result, design freedom can be ensured and the weight of the vehicle can be reduced.

It will be noted that in the present embodiment also, as in a vehicle front portion structure 50A shown in FIG. 7, the number of places where the rear joining portions 46 are joined to the front side members 16 may also be reduced from seven to four so that the fastening force between the rear joining portions 46 and the front side members 16 is set about the same as the fastening force between the front joining portions 44 and the front side members 16.

It will be noted that although in the first and second embodiments an electric automobile was described as an example of the vehicle 10, the vehicle front portion structure of the present disclosure may also be applied to other vehicles, such as gasoline vehicles, fuel cell automobiles, and hybrid vehicles.

What is claimed is:

1. A vehicle front portion structure comprising:
   front side members that are disposed at right and left side portions of a vehicle front portion and that extend in a vehicle front and rear direction;
   suspension towers that are disposed so as to project in a vehicle upward direction from the front side members, the suspension towers including front joining portions and rear joining portions, in the vehicle front and rear direction;
   the front joining portions joining the suspension towers and the front side members to each other such that joining between the suspension towers and the front side members is cancelled at a time of a frontal impact;
   the rear joining portions joining the suspension towers and the front side members to each other; and
   a suspension member attached by attachment portions to the front side members,
   wherein the attachment portions are disposed in positions coinciding with the rear joining portions in the vehicle front and rear direction.

2. The vehicle front portion structure according to claim 1, wherein a joining strength between the suspension towers and the front side members at the front joining portions is weaker than a joining strength between the suspension towers and the front side members at the rear joining portions.

3. The vehicle front portion structure according to claim 1, wherein the front joining portions and the rear joining portions project in a vehicle downward direction from lower ends of the suspension towers, and recess portions are formed between the front joining portions and the rear joining portions.

4. The vehicle front portion structure according to claim 1, wherein vertical center lines of the attachment portions are respectively aligned with vertical centerlines of the rear joining portions along the front-rear direction of the vehicle.

5. The vehicle front portion structure according to claim 1, wherein the suspension member extends between and connects to the front side members.

6. The vehicle front portion structure according to claim 1, wherein the suspension member includes a pair of side rails disposed under the front side members.

* * * * *